US008970472B2

(12) United States Patent
Ha (10) Patent No.: US 8,970,472 B2
(45) Date of Patent: Mar. 3, 2015

(54) APPARATUS FOR DRIVING LIGHT EMITTING DIODE ARRAY AND LIQUID CRYSTAL DISPLAY DEVICE USING THE SAME

(71) Applicant: LG Display Co., Ltd., Seoul (KR)

(72) Inventor: ByeongYun Ha, Gumi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/062,541

(22) Filed: Oct. 24, 2013

(65) Prior Publication Data

US 2014/0168569 A1      Jun. 19, 2014

(30) Foreign Application Priority Data

Dec. 18, 2012    (KR) .................. 10-2012-0148659

(51) Int. Cl.
*G09G 3/36*         (2006.01)
*H05B 37/02*        (2006.01)
*G02F 1/1335*       (2006.01)
*H05B 33/08*        (2006.01)

(52) U.S. Cl.
CPC ...... *G02F 1/133603* (2013.01); *H05B 33/0824* (2013.01); *H05B 33/0827* (2013.01); *H05B 33/0848* (2013.01); *H05B 37/02* (2013.01)
USPC .......... 345/102; 345/204; 345/46; 315/185 R; 315/151; 315/291; 315/307

(58) Field of Classification Search
USPC ............ 315/185 R, 151, 291, 294, 307, 308, 315/312, 209 R, 250; 345/102, 204, 46, 690, 345/69, 76, 77, 82
See application file for complete search history.

(56) References Cited

U.S. PATENT DOCUMENTS

| | | | | |
|---|---|---|---|---|
| 6,509,885 B1 * | 1/2003 | Hanaki et al. | .................... | 345/76 |
| 7,697,583 B2 * | 4/2010 | Furukawa et al. | ......... | 372/38.02 |
| 8,120,571 B2 * | 2/2012 | Ezaki et al. | .................... | 345/102 |
| 8,159,140 B2 * | 4/2012 | Takata et al. | ............. | 315/185 R |
| 8,390,262 B2 * | 3/2013 | Chang et al. | .................... | 323/282 |
| 8,604,720 B2 * | 12/2013 | Wang et al. | .................... | 315/360 |
| 8,742,695 B2 * | 6/2014 | Wray | ............................ | 315/307 |
| 2010/0289424 A1 | 11/2010 | Chang et al. | | |

* cited by examiner

*Primary Examiner* — Vibol Tan
(74) *Attorney, Agent, or Firm* — Fenwick & West LLP (57) ABSTRACT

Disclosed are an apparatus for driving a light emitting diode (LED) array and an LCD device using the same. The apparatus for driving the LED array includes a current amount setter configured to have a resistance value which varies according to a selection signal inputted from an external system, and a controller configured to generate a driving voltage and a driving current by using an input voltage inputted from the external system and the resistance value set by the current amount setter, and supply the driving voltage and the driving current to the LED array.

16 Claims, 7 Drawing Sheets

FIG. 1

Related Art

APPARATUS FOR DRIVING LIGHT EMITTING DIODE ARRAY AND LIQUID CRYSTAL DISPLAY DEVICE USING THE SAME

CROSS-REFERENCE TO RELATED APPLICATIONS

This application claims the benefit of the Korean Patent Application No. 10-2012-0148659 filed on Dec. 18, 2012, which is hereby incorporated by reference as if fully set forth herein.

BACKGROUND

1. Field of the Invention

The disclosure relate to an apparatus for driving a light emitting diode (LED) array, and more particularly, to an apparatus for driving an LED array used as a backlight of a liquid crystal display (LCD) device and an LCD device using the same.

2. Discussion of the Related Art

Flat panel display devices are widely used for various electronic devices such as large-size digital televisions (TVs) requiring a reduction in weight and thickness as well as mobile devices which necessarily need a small size and low power. In the flat panel display devices, LCD devices are applied to all electronic products ranging from small-size devices to large-size devices, and thus are being most widely used.

Since a liquid crystal panel applied to LCD devices cannot self-illuminate, a light source called a backlight is disposed at a rear surface of the liquid crystal panel. Light emitted from the backlight is outputted to the outside through a liquid crystal layer and color filter of the liquid crystal panel, thereby enabling an image to be displayed by the liquid crystal panel. Cold cathode fluorescent lamps (CCFLs), external electrode fluorescent lamps (EEFLs), or the like are being widely used as the backlight.

However, recently, LEDs which are sufficiently high in luminance and are low in power consumption and manufacturing cost were developed to replace the above-described backlights. That is, since a backlight unit using an LED array does not use a high-cost diffusive film and does not need an inverter unlike fluorescent lamps, the manufacturing cost can be saved, a panel can be easily enlarged in size, a thickness and weight can be reduced, and power consumption and environmental problems can decrease. Accordingly, the backlight unit using the LED array is being widely used.

A backlight unit using LEDs includes an LED array having a plurality of LED strings, each of which is configured with a plurality of LEDs. An amount of light emitted from an LED is proportional to a level of a driving current passing through an active layer of the LED. Driving of the LED denotes supplying and controlling a driving current which flows to the LED.

Figure 1:
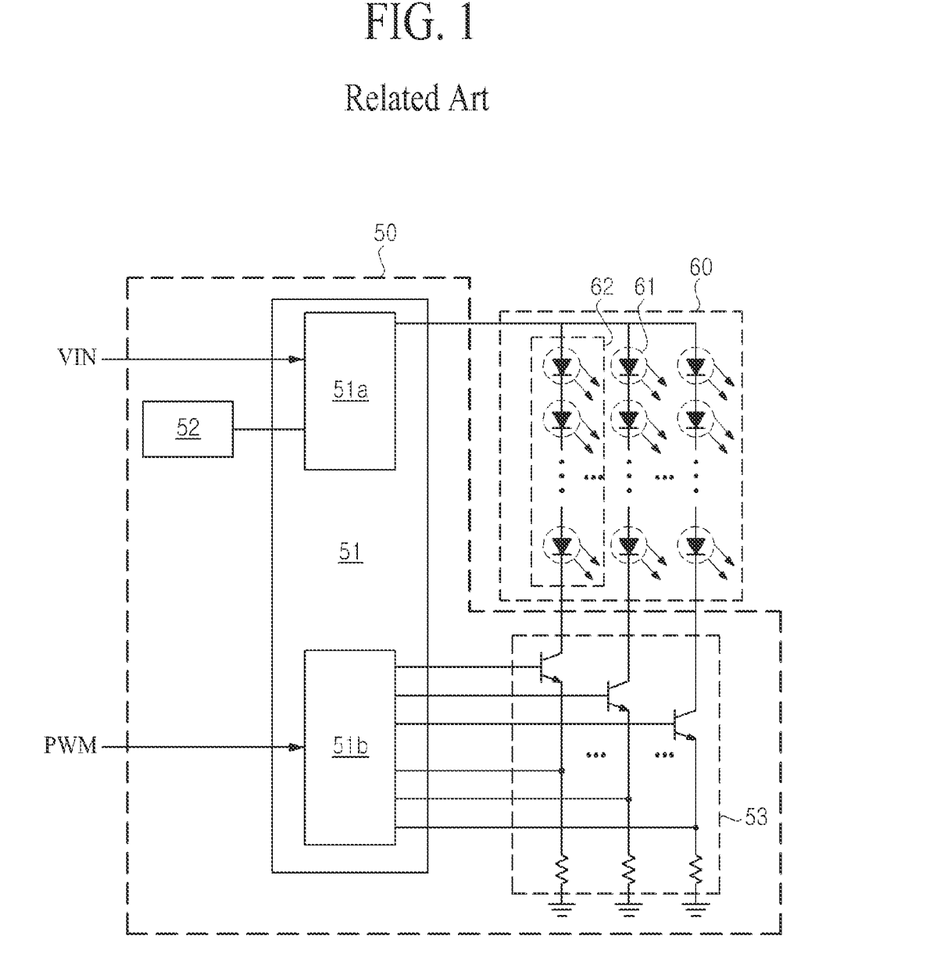
FIG. 1 is an example diagram illustrating a configuration of a related art apparatus for driving an LED array.

FIG. 1 is an example diagram illustrating a configuration of a related art apparatus for driving an LED array 60. A related art apparatus 50 for driving an LED array 60, as illustrated in FIG. 1, includes: a control unit 51 that supplies power to an LED array 60 by using an input voltage VIN received from an external source, and controls the amount of current to flow in the LED array 60; a current fixing unit 52 that provides a certain resistance to the control unit 51 in order for a certain amount of current to be supplied to the LED array 60; and a switching unit 53 that controls current flowing in the LED array 60 to vary a luminance of the LED array 60.

The control unit 51 is generally configured as an integrated circuit (IC), and may be mounted on a main board of an LCD device together with a timing controller. The switching unit (current varying unit) 53 may be provided inside or outside the control unit 51. The current fixing unit 52 is disposed outside the control unit 51, and set to have a certain resistance value.

The related art apparatus 50 for driving the LED array controls the luminance of the LED array 60, for controlling the power consumption of the LED array 60. To this end, first, the current fixing unit 52 is set to have an impedance value, which controls the maximum current supplied to the LED array 60 and thus enables the LED array 60 to output a luminance of 100%. Therefore, the control unit 51 continuously supplies a current having the maximum value to the LED array 60 by using the resistance value set by the current fixing unit 52 and the input voltage VIN supplied from an external system.

The control unit 51 includes a power supplier 51a for supplying a voltage and a current to the LED array 60 by using the input voltage VIN and the maximum current. A current supplied to the LED array 60 is fixed to the maximum value by the current fixing unit 52, and the LED array 60 outputs the maximum luminance with the maximum current.

When the LED array 60 outputs light having the maximum luminance, an image displayed by a panel can be preferably sharpened. However, when the LED array 60 outputs light having the maximum luminance, energy consumption increases proportionally. In order to decrease the amount of consumed energy, the control unit 51 generally uses a pulse width modulation (PWM) signal received from the external system. For this purpose, the control unit 51 includes a current amount controller 51b.

The PWM signal is composed of pulses that have a constant cycle but vary in pulse width, and a turn-on time of a thin film transistor (TFT) configuring the switching unit 53 is controlled by the PWM signal. The time during which the maximum current flows to the LED array 60 is controlled by controlling the turn-on time of the TFT, and thus, a luminance of the LED array 60 may be changed. For example, in dividing one pulse width by a cycle ratio, a high signal occupies 10% and a low signal occupies 90% when a ratio of 10%, and when a ratio of 70%, the high signal occupies 70% and the low signal occupies 30%.

Specifically, when the PWM signal is generated at the ratio of 10%, a high signal having a narrow pulse width is generated, and inputted to the switching unit 53 through the current amount controller 51b. In this case, since the pulse width of the high signal is narrow, a time for which the TFT of the switching unit 53 is turned on is shortened, and thus, a time for which a current flows to the LED array 60 is shortened. Therefore, the luminance of the LED array 60 decreases.

On the other hand, when the PWM signal is generated at the ratio of 70%, a high signal having a broad pulse width is generated, and inputted to the switching unit 53 through the current amount controller 51b. In this case, since the pulse width of the high signal is broad, a time for which the TFT of the switching unit 53 is turned on is extended, and thus, a time for which a current flows to the LED array 60 is extended. Therefore, the luminance of the LED array 60 increases.

Manufacturers of various electronic products such as notebook computers, TVs, tablet personal computers (PCs), etc., by using the above-described LCD device, may adjust the amplitude of the pulse width of the PWM signal sent to the control unit 51 to adjust the amount of power consumed by the LCD device and electronic product.

In order to drive the LCD device and an electronic product with low power, a PWM signal having a narrow pulse width may be received at the current amount control unit 51b from the external system. Conversely, in order to drive the LCD device and an electronic product with high power so as to display a clear image, a PWM signal having a broad pulse width may be received at the current amount control unit 51b from the external system. Accordingly, electronic products vary the pulse width of the PWM signal, and thus drive the LCD devices with desired power.

However, the above-described LCD device of the related art has the following problems. First, the PWM signal must be received from the external system to the control unit 51, for adjusting the luminance of the LED array 60. Therefore, it is difficult for a manufacturer, which is unable to directly develop a PWM signal, to manufacture an electronic product by using the related art LCD device.

Second, the PWM signal for adjusting the luminance of the LED array 60 is required to be synchronized with the frame rate of the LCD device so as to prevent a wavy noise. Therefore, the external system which is driven in connection with the related art LCD device needs to include separate circuits for generating the PWM signal synchronized with the frame rate. For this reason, there is a limitation in developing and manufacturing the external system.

SUMMARY

Embodiments relate to an apparatus for driving a light emitting diode (LED) array. The apparatus includes a current amount setter and a controller coupled to the current amount setter and the LED array. The current amount setter varies a voltage at a node or a current in the node of the current amount setter according to a selection signal from an external system. The controller includes a power supplier and a signal supplier. The power supplier adjusts a level of current provided to the LED array based on an input voltage received from the external system and the resistance across the current amount setter. The signal supplier distributes direct current (DC) signals remaining unchanged during a frame cycle to a plurality of switches coupled to the LED array to turn on or off LEDs in the LED array.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments, examples of which are illustrated in the accompanying drawings. Wherever possible, the same reference numbers will be used throughout the drawings to refer to the same or like parts.

Hereinafter, embodiments will be described in detail with reference to the accompanying drawings.

Figure 2:
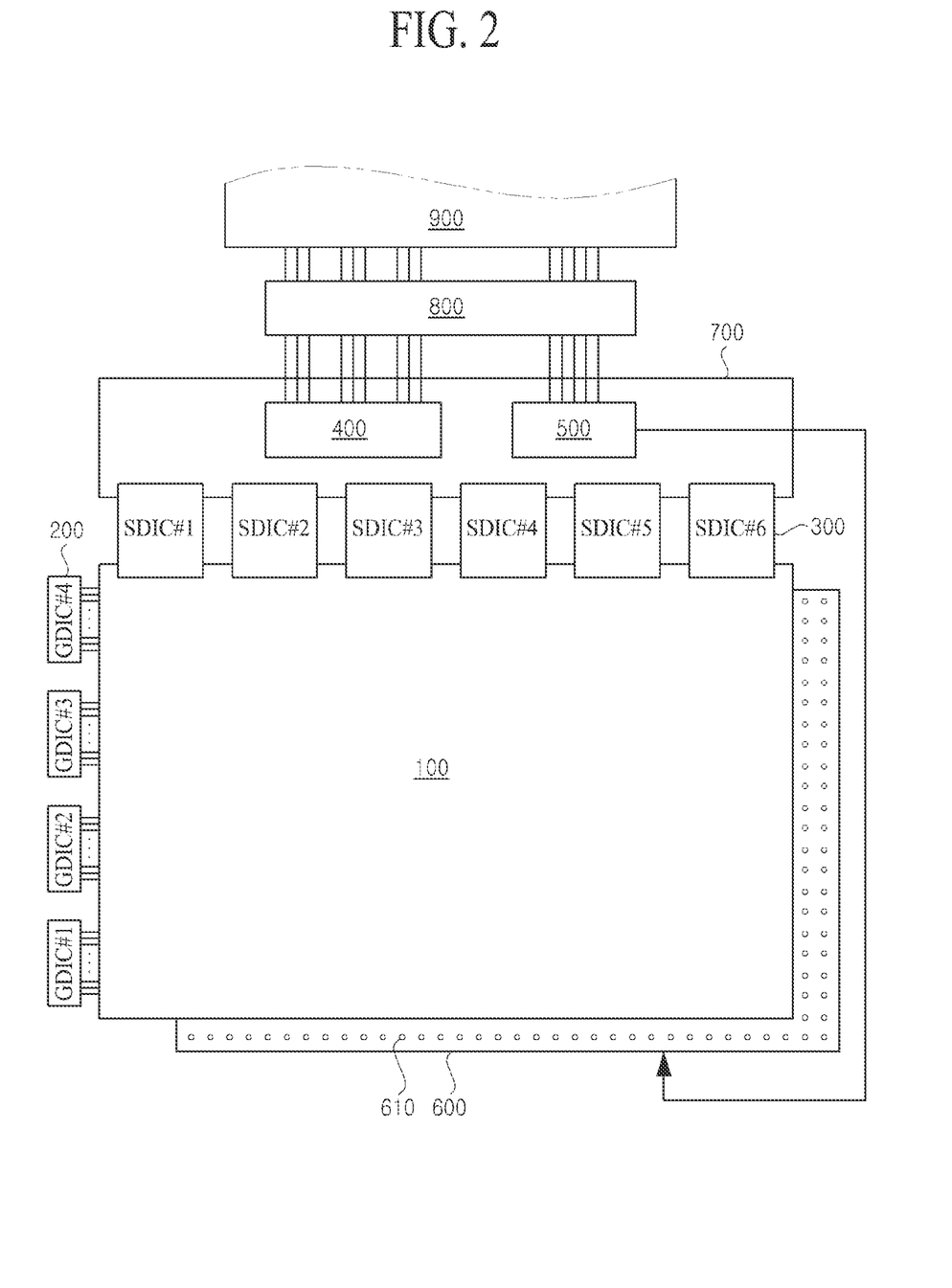
FIG. 2 is a block diagram illustrating an embodiment of an LCD device according to one embodiment.
Figure 3:
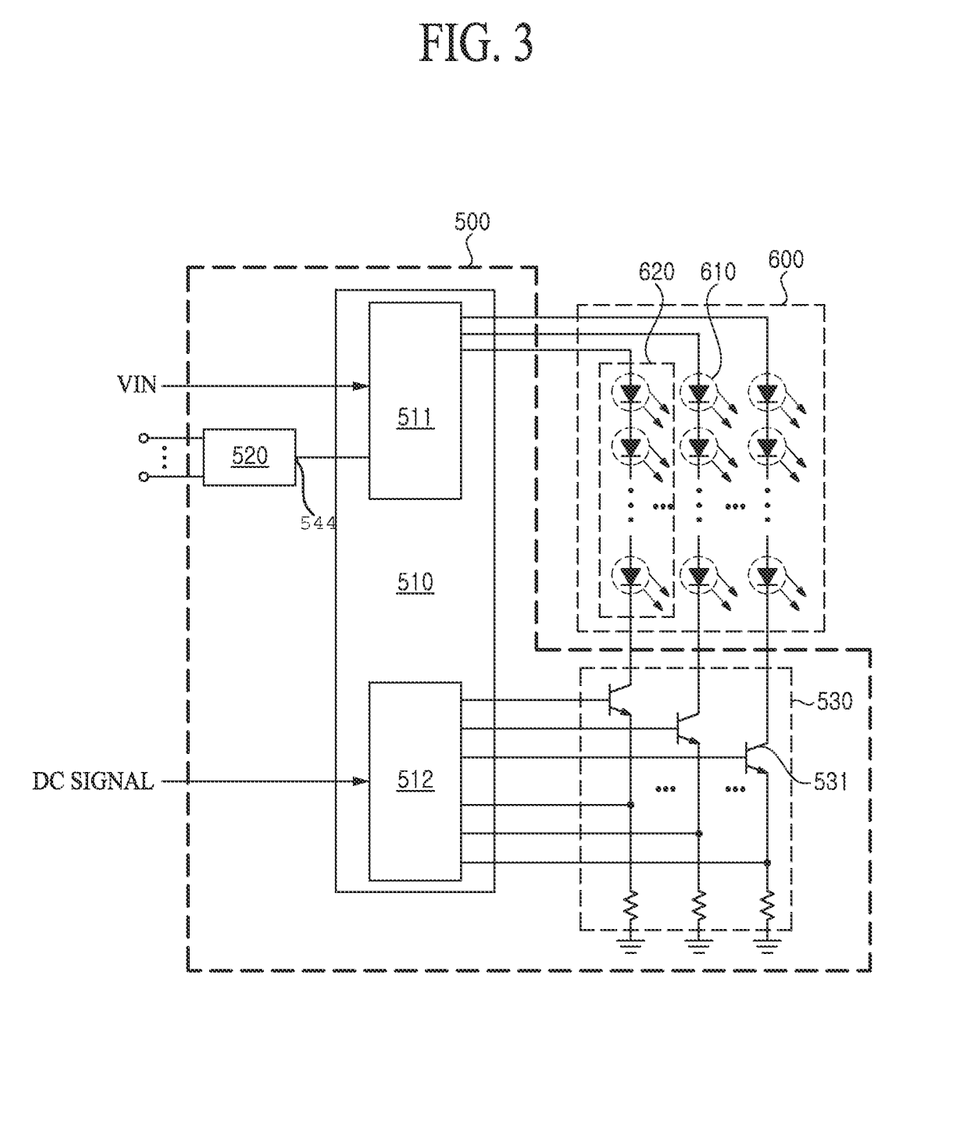
FIG. 3 is a block diagram illustrating an embodiment of an LED array and an LED array driving apparatus which are applied to the LCD device according to one embodiment.

FIG. 2 is a block diagram illustrating an LCD device according to one embodiment. FIG. 3 is a block diagram illustrating an embodiment of an LED array and an LED array driving apparatus which are applied to the LCD device.

The LCD device, as illustrated in FIG. 2, includes: a panel 100 having a plurality of pixels formed in a plurality of areas defined by intersections between a plurality of gate lines and a plurality of data lines; a plurality of drivers 200, 300 and 400 that control signals to be supplied to the gate lines and the data lines; an LED array 600 that irradiates light on the panel 100; and an LED array driving apparatus 500 that changes a resistance value according to a selection signal received from an external system 900 to vary the amount of current provided to the LED array 600. Here, the external system 900 controls the function of an electronic product using the LCD device according to one embodiment. For example, when the electronic product is a computer, the external system 900 may be a main board that controls a function of the computer, and, when the electronic product is a TV, the external system 900 may be a main board that controls a function of the TV. Also, when the electronic product is a smart phone, the external system 900 may be a main board that controls a function of the smart phone. The external system 900 may be electrically connected to the LED array 600 through a connector 800.

The panel 100 includes the plurality of pixels including a thin film transistor (TFT) and pixel electrodes formed in each of the plurality of areas defined by intersections between the gate lines and the data lines.

The TFT supplies a data voltage, applied from a corresponding data line, to the pixel electrode in response to a scan signal supplied from a corresponding gate line. The pixel electrode drives liquid crystal filled between the pixel electrode and a common electrode to adjust a transmittance of light in response to the data voltage.

A liquid crystal mode of the panel 100 may use various liquid crystal modes, in addition to a twisted nematic (TN) mode, a vertical alignment (VA) mode, an in-plane switching (IPS) mode, and a fringe field switching (FFS) mode. Also, the LCD device may be implemented in various types such as a transmissive LCD device, a semi-transmissive LCD device, a reflective LCD device, etc.

The driver controls signals to be supplied to the gate lines and the data lines, and includes a gate driving IC 200 for supplying the scan signal to the gate lines, a source driving IC 300 for supplying data voltages to the respective data lines, and a timing controller 400 for controlling the gate driving IC 200 and the source driving IC 300.

The timing controller 400 generates a gate control signal GCS for controlling an operation timing of each of the gate driving ICs (GDIC #1 through GDIC #4) 200 and a data control signal DCS for controlling an operation timing of each of the source driving ICs (SDIC #1 through SDIC #6) 300 by using a timing signal (e.g., a vertical sync signal Hsync, a horizontal sync signal Hsync, a data enable signal DE, etc.) received from the external system 900.

The gate control signal GCS includes a gate start pulse GSP, a gate shift clock signal GCS, a gate output enable signal GOE, a gate start signal VST, etc. The data control signal DCS includes a source start pulse SSP, a source sampling clock SSC, a source output enable signal SOE, a polarity control signal POL, etc.

Moreover, the timing controller 400 realigns digital input video data (input RGB) received from the external system 900 according to a pixel type of the panel 100, and supplies the realigned image data to the source driving ICs 300.

Each of the gate driving ICs (GDIC #1 through GDIC #4) 200 supplies the scan signal to the gate lines by using the gate control signal GCS generated by the timing controller 400. The gate driving IC 200 may use the same or similar gate driving IC used in the LCD device of FIG. 1.

The gate driving IC 200 as illustrated in FIG. 3, may be configured independently from the panel 100, and electrically connected to the panel 100 in various ways. Alternatively, the gate driving IC 200 may be a gate-in-panel (GIP) type where the gate driving IC 200 is disposed in the panel 100.

Each of the source driving IC 300 converts digital image data transferred from the timing controller 400 into data voltages, and supplies the data voltages of horizontal lines to the corresponding data lines at every horizontal period. For each horizontal period, a scan signal is supplied to one gate line.

The source driving IC 300 converts the image data into the data voltages by using gamma voltages supplied from a gamma voltage generator (not shown), and outputs the data voltages to the corresponding data lines. To this end, although not shown, the source driving IC 300 includes a shift register, a latch, a digital-to-analog converter (DAC), and an output buffer. The shift register generates a sampling signal by using data control signals (SSC, SSP, etc.) received from the timing controller 400. The latch latches the digital image data sequentially received from the timing controller 400, and then simultaneously outputs the latched image data to the DAC. The DAC simultaneously converts the image data, transferred from the latch, into positive or negative data voltages, and outputs the positive or negative data voltages. Specifically, the DAC converts the image data into the positive or negative data voltages by using a polarity control signal POL received from the timing controller 400, and outputs the positive or negative data voltages to the corresponding data lines. The DAC converts the image data into the respective data voltages by using a high-level driving voltage VDD.

The output buffer outputs the positive or negative data voltages, transferred from the DAC, to the corresponding data lines of the panel 100 according to a source output enable signal SOE received from the timing controller 400.

The source driving IC 300 may receive image data from the timing controller 400 by using an embedded point to point interface (EPI) type interface, or receive image data from the timing controller 400 by using mini-low voltage differential signaling (LVDS) type interface.

The LED array 600, as illustrated in FIG. 3, may include N number of LED strings 620. Each of the N LED strings 620 includes a plurality of LEDs 610 which are serially connected to each other.

The LED array driving apparatus 500 changes a resistance value according to the selection signal inputted from the external system 900 to vary the amount of current sent to the LED array 600.

Power consumed by the LED array 600 varies according to the amount of current supplied to the LED array 600. In the related art, when the amount of current supplied to the LED array 600 is fixed to the maximum amount of current, power consumption of the LED array is controlled by controlling a time during which the current flows to the LED array, according to a PWM signal. Accordingly, the power consumption of the LED array 600 may vary according to a pulse width of the PWM signal.

On the other hand, the LED array driving apparatus 500 according to embodiments varies the amount of current supplied to the LED array 600. That is, in the related art, an amount of current supplied to the LED array 600 is set to the maximum value which enables the LED array 600 to output the maximum luminance. An amount of current supplied to the LED array 600 is set to a specific value by a user's selection.

Embodiments detect a level of voltage at node or current in the node connected to a controller to set a current in the LED array to a specific value. When the LED array driving apparatus 500 generates a driving current to be supplied to the LED array 600 by using the input voltage VIN supplied from the external system 900, a level of the driving current may vary according to a resistance value of the LED array driving apparatus 500.

To use the above-described method, as illustrated in FIG. 3, the LED array driving apparatus 500 according to an embodiment includes: a current amount setter 520 that has a resistance value varying according to the selection signal inputted from the external system 900; and a controller 510 that generates a driving voltage and a driving current by using the input voltage VIN received from the external system 900 and a level of voltage at a node 544 or the current in the node 544 of the current amount setter 520, and supplies the driving voltage and the driving current to the LED array 600. That is, the level of the driving current supplied to the LED array 600 may vary by changing the resistance value of the current amount setter 520.

For example, when the total resistance value of the current amount setter 520 is 35 kΩ, a current of 42.9 mA is supplied from the controller 510 to the LED array 600, and thus a luminance of the LED array 600 is 100%. In this state, when the total resistance value of the current amount setter 520 is changed to 52.5 kΩ, a current of 28.6 mA is supplied from the controller 510 to the LED array 600, and thus the luminance of the LED array 600 is changed to 75%, and, when the total resistance value of the current amount setter 520 is changed to 70 kΩ, a current of 21.4 mA is supplied from the controller 510 to the LED array 600, and thus the luminance of the LED array 600 is changed to 50%.

Therefore, a user desiring to drive the LED array 600 with the minimum power supplies the selection signal, allowing the node 544 of the current amount setter 520 to have a voltage or current which allows the driving current to be the minimum, to the current amount setter 520 through the external system 900. To this end, the current amount setter 520 includes at least one or more selection terminals for receiving the selection signal from the external system 900. A specific example of the current amount setter 520 will be described in detail with reference to FIGS. 4 through 7.

The LED array driving apparatus 500, as illustrated in FIG. 2, is mounted on a main board 700, and connected to the external system 900 through the connector 800.

Among the drivers, especially, the timing controller 400 may be mounted on the main board 700. That is, the LED array driving apparatus 500 and the timing controller 400 are mounted on the main board 700, and electrically connected to the external system 900 through the connector 800. The input video data and the timing signals may be transferred from the external system 900 to the timing controller 400 through the connector 800.

The LED array driving apparatus 500 may further include a current amount selector 530 configured with a plurality of switching transistors 531 which are connected between a ground terminal and the corresponding LED strings 620 of the LED array 600. A direct current (DC) signal from the external system 900 is supplied to the switching transistors 531.

The DC signal remains constant throughout a frame cycle of the LCD device. When the DC signal is supplied to the switching transistors 531, the switching transistors 531 maintain a turn-on state, and thus, the amount of current flowing to the LED array 600 remains substantially unchanged during the frame cycle. Therefore, a certain current selected according to a resistance value set by the current amount setter 520 may be continuously supplied to the LED array 600.

In order for the DC signal to be supplied from the external system 900 to the switching transistors 531, the controller 500 may include a power supplier 511 operating as a variable current source for the LED strings 620 and a DC signal supplier 512 that transfers the DC signal received from the external system 900 to the switching transistors 531.

The power supplier 511 generates current outputs for LED strings 620 based on the input voltage VIN received from the external system 900 and the resistance value set by the current amount setter 520, and supplies the current to the LED strings of the LED array 600.

The DC signal supplier 512 supplies the DC signal received from the external system 900 to the switching transistors 531.

In other embodiments, the switching transistors 531 configuring the current amount selector 530 may be provided inside the controller 510.

In one embodiment, the controller 510 is implemented as MAX 16814 integrated circuit, available from Maxim Integrated at San Jose, Calif.

The related art LED array driving apparatus of FIG. 1 includes the switching unit 53 instead of the current amount selector 530, and includes the current amount controller 51b instead of the DC signal supplier 512. In the related art LED array driving apparatus of FIG. 1, a PWM signal is sent to the current amount controller 51b, and then sent to the switching transistors of the switching unit 53.

However, the DC signal is sent to the DC signal supplier 512 included in the LED array driving apparatus, and then sent to the switching transistors of the current amount selector 530.

Figure 4:
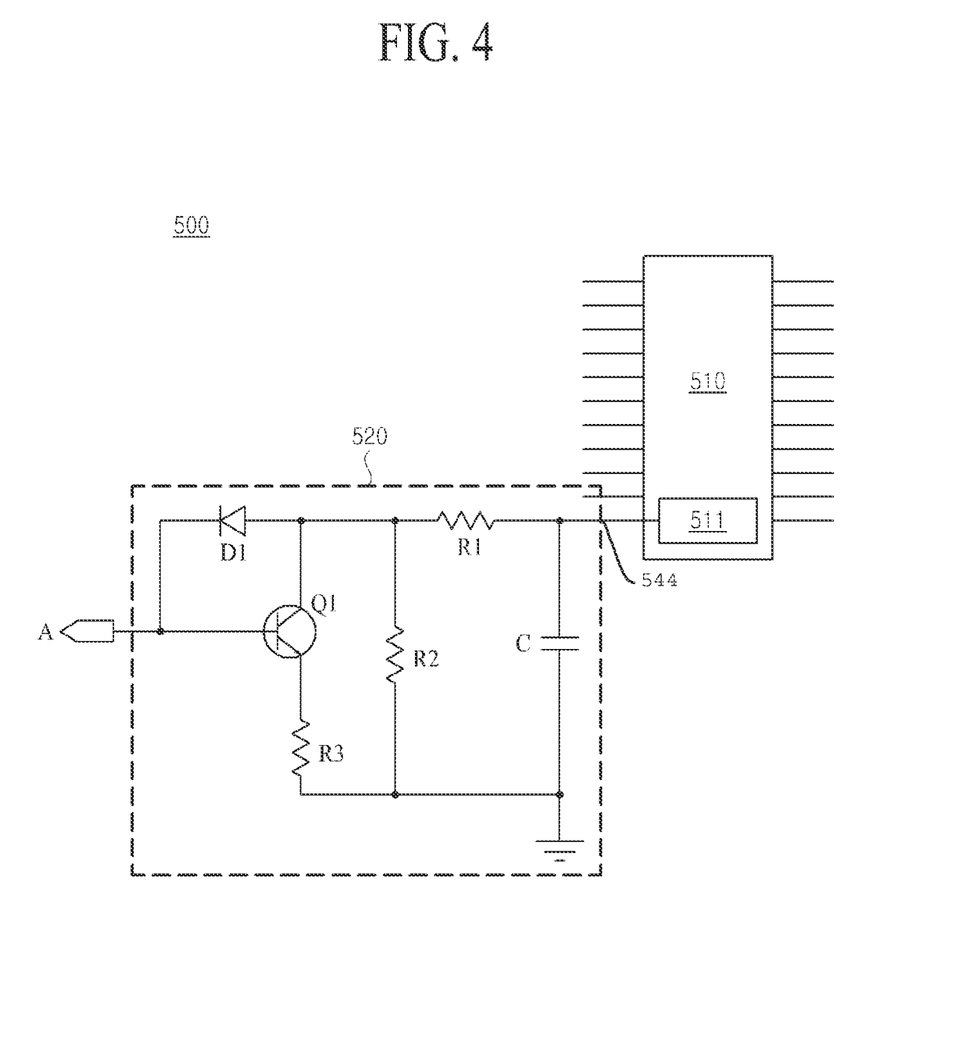
FIG. 4 is a block diagram illustrating an embodiment of a current amount setter applied to an LED array driving apparatus according to a first embodiment.
Figure 5:
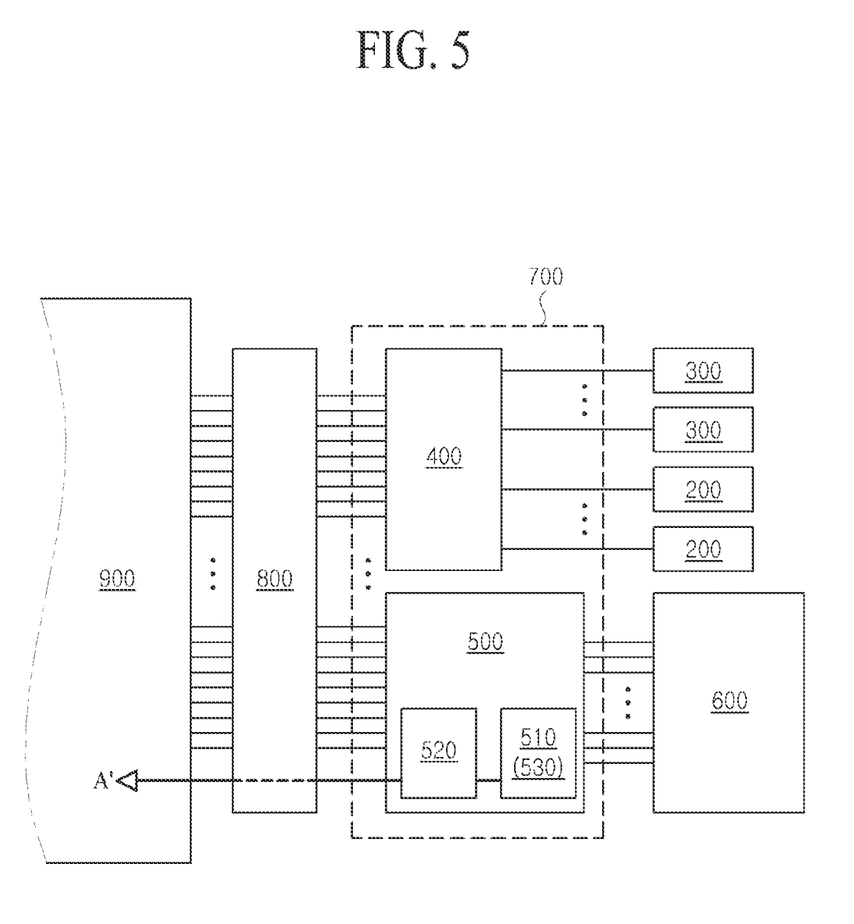
FIG. 5 is an example diagram illustrating a state in which an LCD device including the LED array driving apparatus according to the first embodiment.
Figure 6:
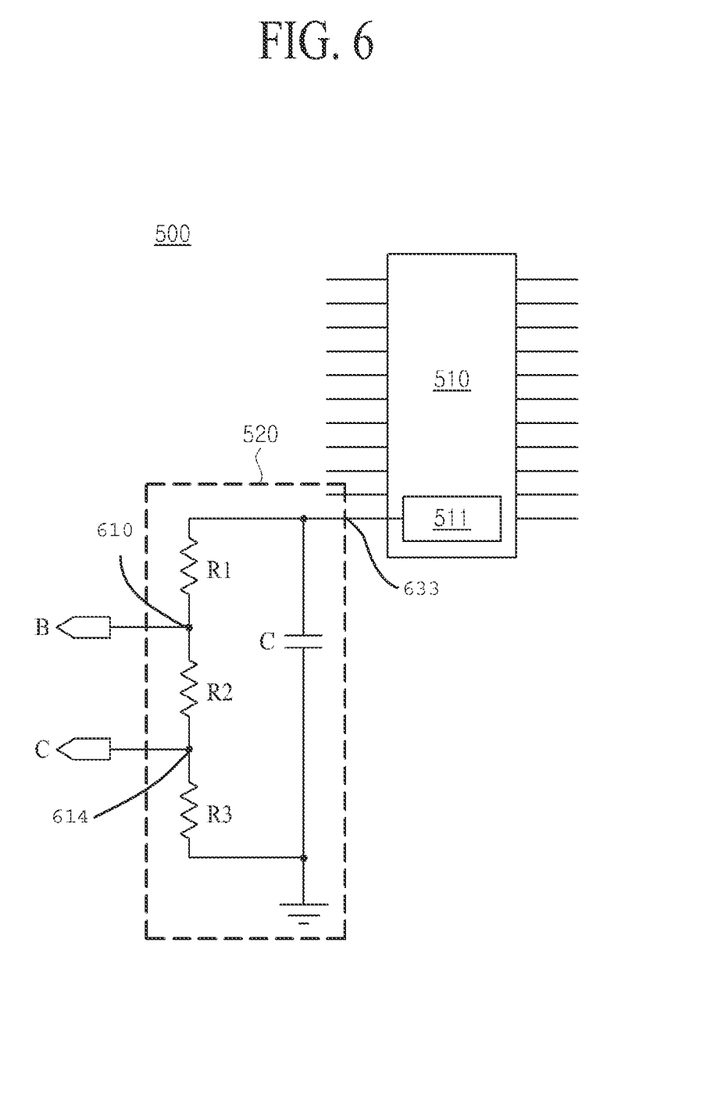
FIG. 6 is a block diagram illustrating an embodiment of a current amount setter applied to an LED array driving apparatus according to a second embodiment.
Figure 7:
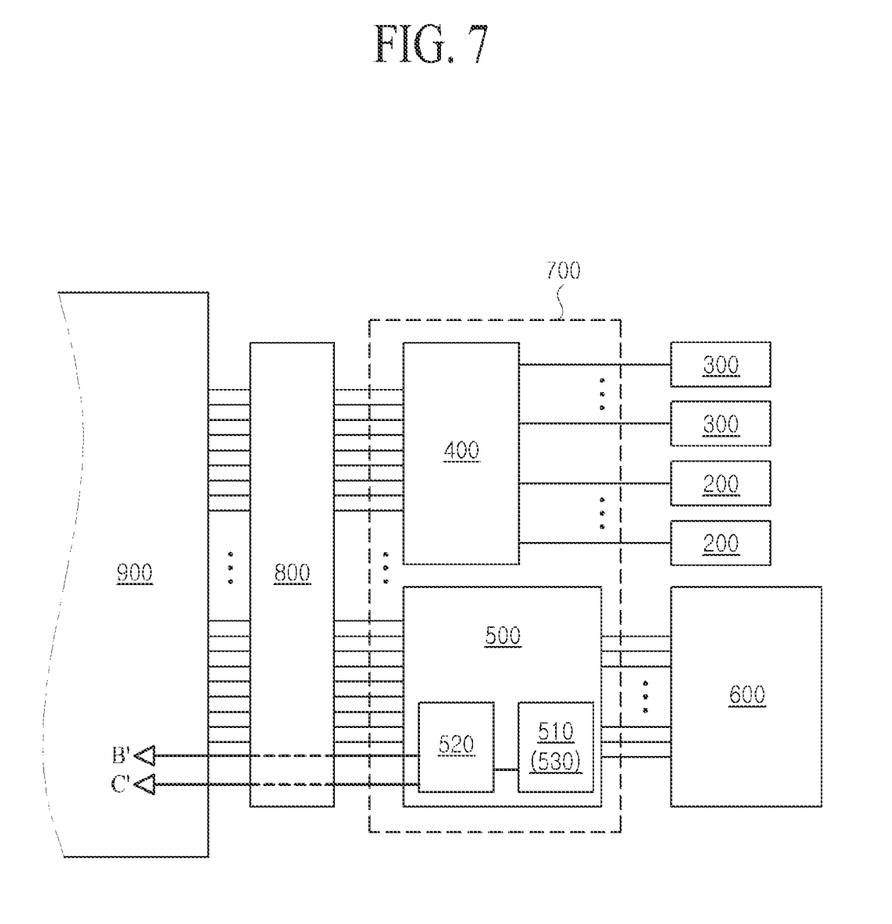
FIG. 7 is an example diagram illustrating a state in which an LCD device including the LED array driving apparatus according to the second embodiment.

FIG. 4 is a block diagram illustrating an embodiment of a current amount setter applied to an LED array driving apparatus according to a first embodiment, FIG. 5 is an exemplary diagram illustrating a state in which an LCD device including the LED array driving apparatus according to the first embodiment is connected to the external system through a connector, FIG. 6 is a block diagram illustrating an embodiment of a current amount setter applied to an LED array driving apparatus according to a second embodiment, and FIG. 7 is an exemplary diagram illustrating a state in which an LCD device including the LED array driving apparatus according to the second embodiment is connected to the external system through a connector.

The current amount setter 520 according to the first embodiment, as illustrated in FIGS. 4 and 5, may include a selection terminal A connected to a selection signal terminal A' of the external system through the connector 800, a transistor Q1 having a gate terminal connected to the selection terminal A, a plurality of resistors R1 to R3 connected to the transistor Q1 in serial or parallel, and a diode D1 connected to the transistor Q1. The current amount setter 520 is connected to the power supplier 511 of the controller 510.

When the impedance of the current amount setter 520 is changed, the voltage at node 633 or current in node 633 of the current amount setter 520 is changed. Such change in the voltage or current in node 633 is detected by the power supplier 511 and causes the amount of current generated by the power supplier 511 to be changed accordingly. The arrangement and number of the transistor, resistors, and diode included in the current amount setter 520 may be varied depending on a range of a current to be varied.

In this case, the selection terminal A may be connected to a high-level voltage terminal or a ground terminal through the selection signal terminal A' of the external system, or may be maintained in a high impedance state (i.e., an open circuit state where the selection terminal is not connected to any output of the external system).

A total resistance value of the current amount setter 520 may be changed according to the selection terminal A being connected to the high-level voltage terminal or ground terminal or having the open state. That is, one selection terminal A connected to the external system 900 is provided in the current amount setter 520, and the current amount setter 520 has different resistance values according to the selection terminal A being connected to the high-level voltage terminal or ground terminal through the external system 900 or being maintained the open state. The level of the driving current generated by the controller 510 varies according to the resistance value.

The LED array driving apparatus 500 according to the first embodiment and the timing controller 400 may be mounted on the main board 700. In this case, as illustrated in FIG. 5, the LED array driving apparatus 500 and the timing controller 400 may be electrically connected to the external system 900 through the connector 800.

The current amount setter 520 applied to the LED array driving apparatus according to the second embodiment, as illustrated in FIGS. 6 and 7, may include at least two or more selection terminals B and C connected to the selection signal terminal A' of the external system through the connector 800, a plurality of resistors R1 through R3 connected in series with the selection terminals B and C connected to nodes 610, 614 between the resistors R1 through R3, and a capacitor C connected to the resistors R1 through R3 in parallel. The current amount setter 520 is connected to the power supplier 511 of the controller 510. When the resistance value of the current amount setter 520 is changed, the voltage at the node 544 or the current in the node 544 is changed. This in turn changes the amount of current generated by the power supplier 511.

The arrangement and number of the resistors, capacitor, and selection terminals B and C included in the current amount setter 520 may be varied depending on a range of a current.

In this case, the selection terminals B and C may be respectively connected to the ground terminal through respective selection signal terminals B' and C' of the external system, or may be maintained in an open state.

The total resistance value of the current amount setter 520 may be changed according to the selection terminals B and C being connected to the ground terminal or having the open state. That is, at least two or more selection terminals B and C connected to the ground terminal or maintained in the open state are provided in the current amount setter 520, and the current amount setter 520 has different resistance values according to selection terminals B and C being connected to the ground terminal through the external system 900 or being maintained in the open state. The level of the driving current outputted from the controller 510 varies according to the resistance value.

The LED array driving apparatus 500 according to the second embodiment and the timing controller 400 may be mounted on the main board 700. In this case, as illustrated in FIG. 7, the LED array driving apparatus 500 and the timing controller 400 may be electrically connected to the external system 900 through the connector 800.

According to one embodiment, the luminance of the LED array is adjusted even without using a PWM signal, and hence, the need for an additional circuit for generating the PWM signal is obviated. The removal of the PWM signal and the circuit for generating this signal also removes a wavy noise caused by the PWM signal.

It will be apparent to those skilled in the art that various modifications and variations can be made to embodiments without departing from the spirit or scope of the embodiments.

What is claimed is:

1. An apparatus for driving a light emitting diode (LED) array, comprising:
    a current amount setter configured to vary a voltage at a node or a current in the node of the current amount setter according to a selection signal from an external system; and
    a controller coupled to the current amount setter and the LED array, the controller comprising:
        a power supplier connected to the node of the current amount setter and configured to adjust a level of current provided to the LED array based on an input voltage received from the external system and the voltage at the node or the current in the node of the current amount setter, and
        a signal supplier configured to distribute direct current (DC) signals remaining unchanged during a frame cycle to a plurality of switches coupled to the LED array to turn on or off LEDs in the LED array.

2. The apparatus of claim 1, wherein the current amount setter comprises a selection terminal connected to the external system, a resistance across the current amount setter determined based on connection of the selection terminal to a high-level voltage terminal or a ground terminal through the external system or being maintained in a high impedance state.

3. The apparatus of claim 1, wherein the current amount setter comprises:
    a capacitor between the node and a low reference voltage;
    a transistor having a gate coupled to the selection terminal;
    a diode between a source of the transistor and the selection terminal;
    a first resistor between the source of the transistor and the node;
    a second resistor between the source of the transistor and the low reference voltage; and
    a third resistor between a drain of the transistor and the low reference voltage.

4. The apparatus of claim 1, wherein the current amount setter comprises at least two selection terminals connected to a ground terminal or maintained in an high impedance state, the resistance across the current amount setter determined based on connection of the selection terminals to the ground terminal through the external system or being maintained in a high impedance state.

5. The apparatus of claim 4, wherein the current amount setter comprises a string of resistors connected in parallel to a capacitor, each of the at least two selection terminals connected between the string of resistors.

6. The apparatus of claim 1, wherein the plurality of switching transistors are connected between a ground terminal and a plurality of LED strings in the LED array.

7. The apparatus of claim 1, wherein the signal supplier is configured to distribute the DC signals to the plurality of switches responsive to receiving a DC signal from the external system.

8. The apparatus of claim 1, wherein the LED array comprises a plurality of strings of LEDs, each string of LEDs coupled to a low reference voltage via each of the plurality of switches.

9. A liquid crystal display (LCD) device including an apparatus for driving a light emitting diode (LED) array, the LCD device comprising:
    a panel in which a plurality of pixels are respectively formed in a plurality of areas defined by intersections between a plurality of gate lines and a plurality of data lines, the panel irradiated by light from the LED array;
    a driver configured to control signals to be supplied to the gate lines and the data lines; and
    an LED array driving apparatus comprising:
        a current amount setter configured to vary a voltage at a node or a current in the node of the current amount setter according to a selection signal from an external system; and
        a controller coupled to the current amount setter and the LED array, the controller comprising:
            a power supplier configured to adjust a level of current provided to the LED array based on an input voltage received from the external system and the resistance across the current amount setter, and
            a signal supplier configured to distribute direct current (DC) signals remaining unchanged during a frame cycle to a plurality of switches coupled to the LED array to turn on or off LEDs in the LED array.

10. The LCD device of claim 9, wherein the current amount setter comprises a selection terminal connected to the external system, a resistance across the current amount setter determined based on connection of the selection terminal to a high-level voltage terminal or a ground terminal through the external system or being maintained in a high impedance state.

11. The LCD device of claim 9, wherein the current amount setter comprises:
    a capacitor between the node and a low reference voltage;
    a transistor having a gate coupled to the selection terminal;
    a diode between a source of the transistor and the selection terminal;
    a first resistor between the source of the transistor and the node;
    a second resistor between the source of the transistor and the low reference voltage; and
    a third resistor between a drain of the transistor and the low reference voltage.

12. The LCD device of claim 9, wherein the current amount setter comprises at least two selection terminals connected to a ground terminal or maintained in an high impedance state, the resistance across the current amount setter determined based on connection of the selection terminals to the ground terminal through the external system or being maintained in a high impedance state.

13. The LCD device of claim 12, wherein the current amount setter comprises a string of resistors connected in parallel to a capacitor, each of the at least two selection terminals connected to a node between the string of resistors.

14. The LCD device of claim 9, wherein the plurality of switching transistors are connected between a ground terminal and a plurality of LED strings in the LED array.

15. The LCD device of claim 9, wherein the signal supplier is configured to distribute the DC signals to the plurality of switches responsive to receiving a DC signal from the external system.

16. The LCD device of claim 9, wherein the LED array comprises a plurality strings of LEDs, each string of LEDs coupled to a low reference voltage via each of the plurality of switches.

* * * * *